United States Patent [19]

Kubota

[11] Patent Number: 4,935,822

[45] Date of Patent: Jun. 19, 1990

[54] METHOD FOR IMAGE REDUCTION PROCESSING ACCORDING TO CRITERION POINTS

[75] Inventor: Mineo Kubota, Kofu, Japan

[73] Assignee: Nippon Seimitsu Kogyo Kabushiki Kaisha, Kofu, Japan

[21] Appl. No.: 299,429

[22] Filed: Jan. 23, 1989

[30] Foreign Application Priority Data

Jun. 3, 1988 [JP] Japan ................................ 63-137685

[51] Int. Cl.⁵ ............................................. H04N 1/40
[52] U.S. Cl. .................................... 358/451; 358/457
[58] Field of Search ............. 358/443, 447, 448, 449, 358/451, 457, 465, 466; 382/47

[56] References Cited

U.S. PATENT DOCUMENTS

| | | | |
|---|---|---|---|
| 4,639,790 | 1/1987 | Kusaka | 358/497 |
| 4,740,844 | 4/1988 | Yoshimura | 358/297 |
| 4,758,897 | 8/1988 | Hiratsuka et al. | 358/298 |
| 4,803,558 | 2/1989 | Hiratsuka et al. | 358/451 |
| 4,827,353 | 5/1989 | Ehlers et al. | 358/451 |

Primary Examiner—Edward L. Coles, Sr.
Assistant Examiner—Jerome Grant, III
Attorney, Agent, or Firm—Oblon, Spivak, McClelland, Maier & Neustadt

[57] ABSTRACT

Image reduction processing of a given original image is effected by determining the brightness of each picture element in a resultant reduced image in accordance with the numbers of black and white pixels in an intermediate matrix image obtained by quantizing the original image. When the black and white pixels in the quantized intermediate matrix image are equal, the aforesaid brightness is determined according to a prescribed criterion matrix pattern having a criterion point, thereby to obtain the reduced image on a display or the like with high fidelity to the original image.

8 Claims, 8 Drawing Sheets

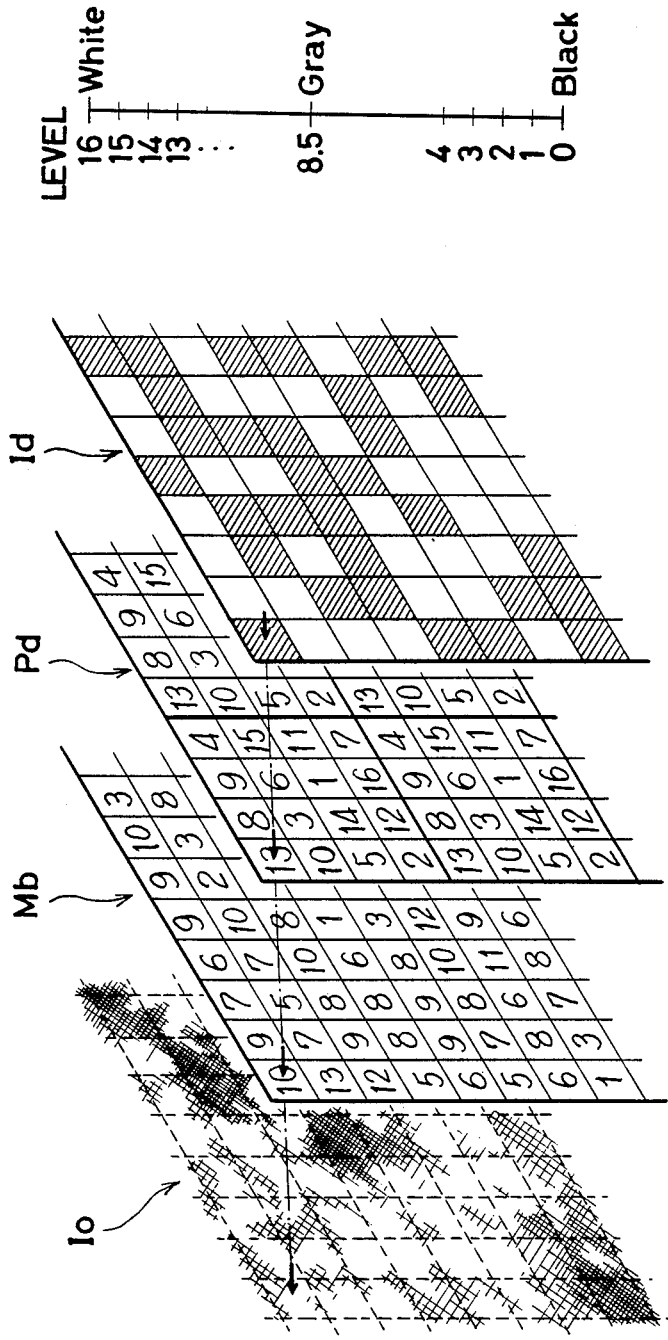

METHOD FOR IMAGE REDUCTION PROCESSING ACCORDING TO CRITERION POINTS

BACKGROUND OF THE INVENTION:

1. Field of the Invention

This invention relates to a method for effecting image reduction processing of image information obtained from a given original image by using an image reading means such as an image scanner, and more particularly to a method for subjecting a halftone image such as a photograph to image reduction processing in accordance with pixel data at criterion points in a prescribed matrix pattern, thereby to output a resultant reduced image to a monitor display of an image processing system, a printer of a word processor or the like with high fidelity of image to the original image.

2. Description of the Prior Art

In a case of subjecting a given image to image processing by utilization of an image processing device such as a word processor and a facsimile, there are frequent occasions when a resultant image which is electrically read by using an image reading means such as an image scanner is reproduced on a monitor display unit or printed in hard copy form at a reduced scale. When an given original image of 100 mm in width is read and quantized by use of an ordinary image scanner having a resolution of 8 dots/mm, a resultant image thus obtained and represented in terms of digital bits is composed of picture elements of as many as 800 dots in total in the width direction. However, an ordinary monitor display such as a CRT which is widely applied to general purpose computers for effecting image processing has generally a display field of a resolution of 640×400 picture elements. This means that the read image obtained by the image scanner cannot be completely displayed on such a monitor display. Thus, it is necessary to reduce a read image to be displayed on the monitor display. Therefore, an image reduction processing has been conventionally performed simply by thinning out, for example, every other pixel to reduce the read image to a scale of one-half.

A dither image-processing method are available for subjecting a halftone image to image digitization. This dither image-processing method will be explained in brief with reference to the typical dither pattern model shown in FIG. 1(A). First, a given original image Io to be subjected to image processing is defined in a matrix and the brightness at each picture element of the matrix of the original image is measured to obtain a brightness matrix pattern Mb. In the illustrated dither pattern model, the brightness is expressed in 16 gradient levels as illustrated in FIG. 1(B). Next, the brightness at each picture element of the brightness matrix pattern Mb is compared with threshold value prescribed in each pixel of a predetermined dither pattern Pd. When the level value of brightness at one picture element of the brightness matrix pattern Mb is less than the threshold value of the corresponding pixel of the dither pattern Pd, the picture element is determined to be "black". Thus, an intermediate dither image Id is obtained and outputted to a monitor display or printer. This dither image processing method has been generally applied to image processing because it can reproduce the given halftone image with relatively high fidelity of image to the original.

In a case where the intermediate dither image Id obtained as a result of the dither image processing noted above is reduced to ½, there have been so far used an image reducing method as shown in FIGS. 2(A) to 2(C). According to the conventional method, in its own way, the intermediate dither image Id can be reduced to one-half by reducing every 2×2 matrix to one picture element. In the image reducing method shown in FIG. 2(A), the brightness feature in every picture element of a resultant reduced image Ir to be outputted to a monitor display or the like is determined on the basis of the brightness of one pixel at a specific location in a prescribed unit matrix. Namely, in the first model illustrated in FIG. 2(A), the upper and left picture elements (pixels a) in every unit matrix with 2×2 pixels are simply applied to the respective picture elements a' in the reduced image Ir. In the second model illustrated in FIG. 2(B), when the unit matrix with 2×2 pixels in the intermediate dither image Id has two or more black picture elements, the corresponding picture element in the reduced image Ir is determined as a "black" picture element Conversely, when the unit matrix with 2×2 pixels of the intermediate dither image Id has two or more white picture elements, the corresponding picture element in the reduced image Ir may be determined as a "white" picture element as illustrated in FIG. 2(C). However, as is apparent from the resulting patterns of the reduced images Ir, all the reduced images are wholly different in visual impressions from the given original image Io. Thus, the conventional image reducing methods could not process a halftone image such as a photograph with good reproductivity of image and were not practical use.

SUMMARY OF THE INVENTION

An object of this invention is to provide a method for effecting image reduction processing with good reproductivity of image, which has the effect of subjecting a halftone image such as a photograph to image reduction processing so as to output a reduced image resultingly obtained to a monitor display of an image processing system, a printer of a word processor, a facsimile or the like with high fidelity of image to the originally given halftone image.

To accomplish the object described above according to the present invention, there is provided a method for effecting image reduction processing, which comprises preparing a criterion matrix pattern composed of at least one unit matrix having a criterion point, quantizing a given original image to obtain a brightness matrix image defined in a matrix with a plurality of pixels, comparing the brightness of each pixel in the brightness matrix image thus obtained with dither value at the corresponding pixel in a predetermined dither pattern to obtain an intermediate dither image, counting the respective black and white pixels in each unit matrix of the intermediate dither image, and determining the brightness of each picture element to be outputted as a reduced image signal according to a prescribed unit criterion matrix pattern when the respective black and white pixels in one unit matrix are equal in number, thereby to derive one black or white picture element signal from each unit matrix of the intermediate dither image.

The criterion point prescribed in the unit matrix of the predetermined criterion matrix pattern may be defined as either "black" or "white". In the case that the criterion point in the criterion matrix pattern is defined as "white", the white picture element signal is outputted when the pixel in the unit matrix of the intermediate dither image which corresponds to the criterion point is white. The columns and rows constituting the predetermined unit criterion matrix having the criterion point are preferably determined in number to be reciprocals or integral multiples of the required image reducing rate. In the case that the numbers of the respective columns and rows in the predetermined criterion matrix are reciprocal multiples of the image reducing rate, the criterion matrix is composed of a plurality of unit matrices and the criterion points of these unit matrices in one criterion matrix pattern may preferably be arranged discretely in pattern.

The brightness of each picture element in the resultant reduced image is determined according to the numbers of the respective black and white pixels in each unit matrix of the intermediate dither image as noted above. When the respective black and white pixels are equal in number, the brightness of the picture element in the reduced image is determined according to the criterion point defined in the predetermined criterion matrix.

Therefore, even a halftone image such as a photograph can effectively be reduced and reproduced as a reduced image on the monitor display or the like with high fidelity of image to the original.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(A) is a diagrammatic illustration for explaining the principle of a dither processing system applicable to image processing of a halftone image;

FIG. 1(B) is an explanatory view of one example of a brightness level scale applied to an image processing method according to this invention;

Figure 2A:
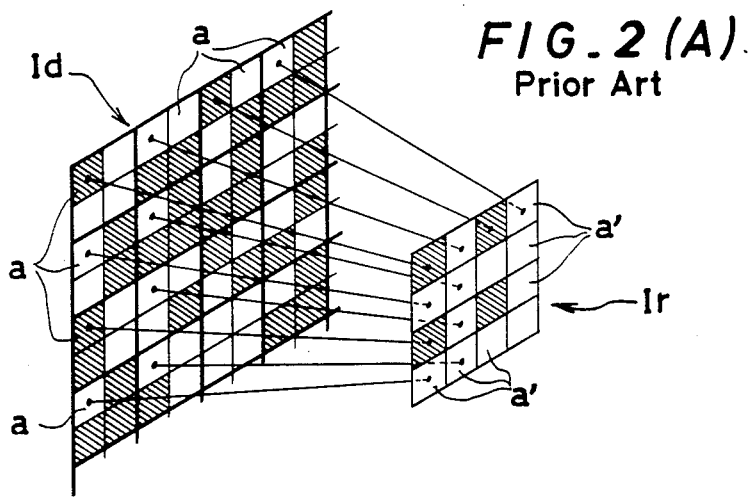
FIGS. 2(A) to 2(C) are explanatory views diagrammatically illustrating models for practicing conventional image reducing methods.
Figure 2B:
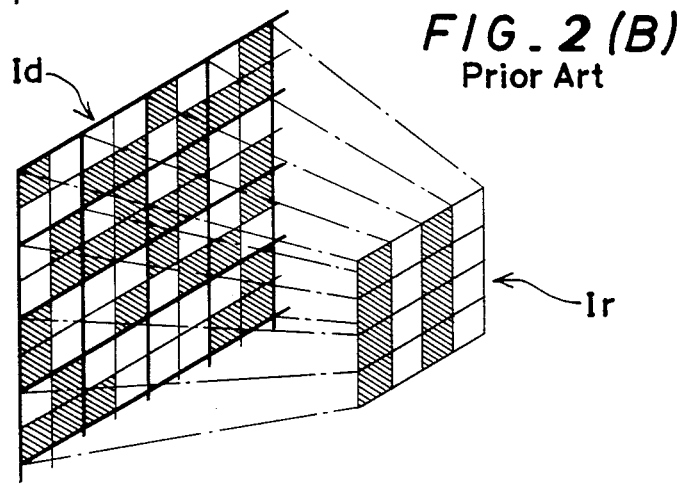
Figure 2C:
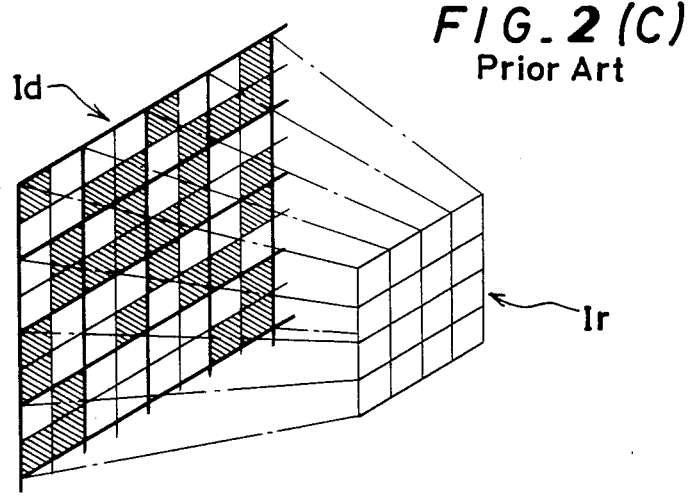

DETAILED DESCRIPTION OF THE PREFERRED EMBODIMENTS:

This invention uses as one example a dither image processing method showing the effect of subjecting a halftone image such as a photograph to image processing. An image processing system capable of practicing the image reducing method of this invention basically has not only the image reducing function, but also functions of processing a given original image at a full or enlarged scale (equality and enlarging functions), similar to an ordinary image processing device capable of processing the given original image in accordance with a predetermined dither pattern. The equality function by which the given original image is displayed on a monitor display on an equal scale will be understood from the model illustrated in FIG. 1(A). Specifically, this invention has as its object the image reducing function of reducing a quantized image read from the given original halftone image by use of an image reading device such as an image scanner to a scale of 1/n. The enlarging function can easily be fulfilled merely by magnifying each pixel of the read image outputted from the image reading device to two or more times.

The principle of the image reducing method according to this invention will be described hereinafter with reference to a flowchart shown in FIG. 3 and a conceptional model shown in FIG. 4.

As the first step, the given original image Io to be displayed on the monitor display is electrically read by the image scanner and so on in such a manner that the brightness at each of picture elements constituting the original image is quantized (Process I). In the illustrated embodiment, the original image Io is defined in the matrix with N-rows (picture elements aligned in the main scanning direction) and M-lines (picture elements aligned in the sub-scanning direction). In FIG. 4, only a matrix composed of $8 \times 8$ picture elements (i.e. $N=M=8$) is illustrated for the sake of brevity. Therefore, the pitch (pixel interval) between the adjacent picture elements is $\frac{1}{8}$ mm when the image reading device for reading the given original image has the resolution of 8 dot/mm. Thus, the brightness at all the picture elements of the original image is quantized to be represented in the digital data, e.g. in terms of binary bits, thereby to obtain a brightness matrix pattern Mb as a read image. In the drawing, the brightness at each pixel in the brightness matrix pattern Mb is shown in 16 gradient numerical values as an example.

The brightness matrix pattern (read image) Mb thus obtained is compared with a predetermined dither pattern Pd (Process II). That is to say, the brightness at each pixel of the read image Mb is compared with a prescribed dither element value (threshold) at the corresponding pixel in the dither pattern Pd. When the brightness value at one pixel in the read image Mb is equal to or smaller than the prescribed dither element value at the corresponding pixel of the dither pattern Pd, the pixel of the read image may be determined as a "black" picture element. On the contrary, when the brightness value at one pixel is larger than the corresponding dither element value, the pixel may be determined as a "white" picture element. As a result, an intermediate dither image Id represented by the black and white picture elements can be obtained (Process III). In this embodiment, the prescribed dither Pd is virtually formed of one unit dither matrix Ud with 4 rows and 4 columns (16 pixels in total) as an example so as to be repeatedly used by the number of times obtained by dividing the total numbers of pixels of the read image Mb in the respective row and line directions by the number of the row or line numbers of the dither pattern Pd. As a matter of course, the pixels in the row and line directions of the unit dither matrix Ud are not limited to the particular numeral as noted above.

Although the brightness level scale is expressed in 16 gradient levels (4 bits) as illustrated in FIG. 1(B), this should not be understood as limitative as a matter of course. In the brightness level scale of FIG. 1(B), the level "0" designates "black" and the level "16" designates "white". The illustrated scale may however be inverted, i.e. the level "0" may be "white" and the level "16" be "black". Incidentally, the level "8.5" designates neutral tints "gray".

Therefore, when the dither image Id obtained as a result of the image dither processing is macroscopically view, a resultingly reproduced image which is represented by the 16 gradient brightness levels is very faithful to the original image.

In a case of outputting the dither image Id thus obtained in the equality mode (Process IV), the image bit data of the intermediate dither image Id as they are may be outputted to the monitor display or the like. When the enlarging mode is chosen (Process V), an image enlargement on the monitor display or the like can be effected simply by magnifying each pixel of the dither image Id to two or more times.

When choosing the image reducing mode which is the essential feature of the present invention, the dither image Id is subjected to image reduction processing in the following manner. Here, let be supposed that a ½ reducing mode is chosen as an example. That is, in this case the image reduction is effected by reducing a $2 \times 2$ unit matrix Mu (4 pixels) in the intermediate dither image Id to one picture element. Although the numbers of the constituent pixels of the unit matrix Mu in the row and column directions are not limited, the total pixels constituting the unit matrix Mu should be an even number.

First, the black pixels (or white pixels) in each unit matrix Mu of the intermediate dither image Id is counted (Process VI). Next, the determination on whether the number Nb of the black pixels in the unit matrix Mu is larger or smaller than half the total pixels in the unit matrix ($n \times n/2$) is carried out (Process VII). In other words, in this process it is determined whether the black pixels in each unit matrix Mu is more in number than the white pixels. When the black pixels is more than half the total pixels (four pixels in this embodiment), one "black" picture element is derived from the unit matrix Mu of the dither image Id (e.g. pixels Mu1-4, Mu2-2, Mu2-3, Mu4-1 and Mu4-4 of the dither image Id in FIG. 4). On the contrary, when the black pixels is less than the white pixels in the unit matrix Mu, one "white" picture element is derived (e.g. pixels Mu1-1, Mu2-4, Mu3-2, Mu4-2 and Mu4-3 of the dither image Id FIG. 4). Thus, one of the black or white picture element signals is outputted per one unit matrix of $n \times n$ defined in the dither image Id, consequently to obtain a reduced image Ir.

Figure 4:
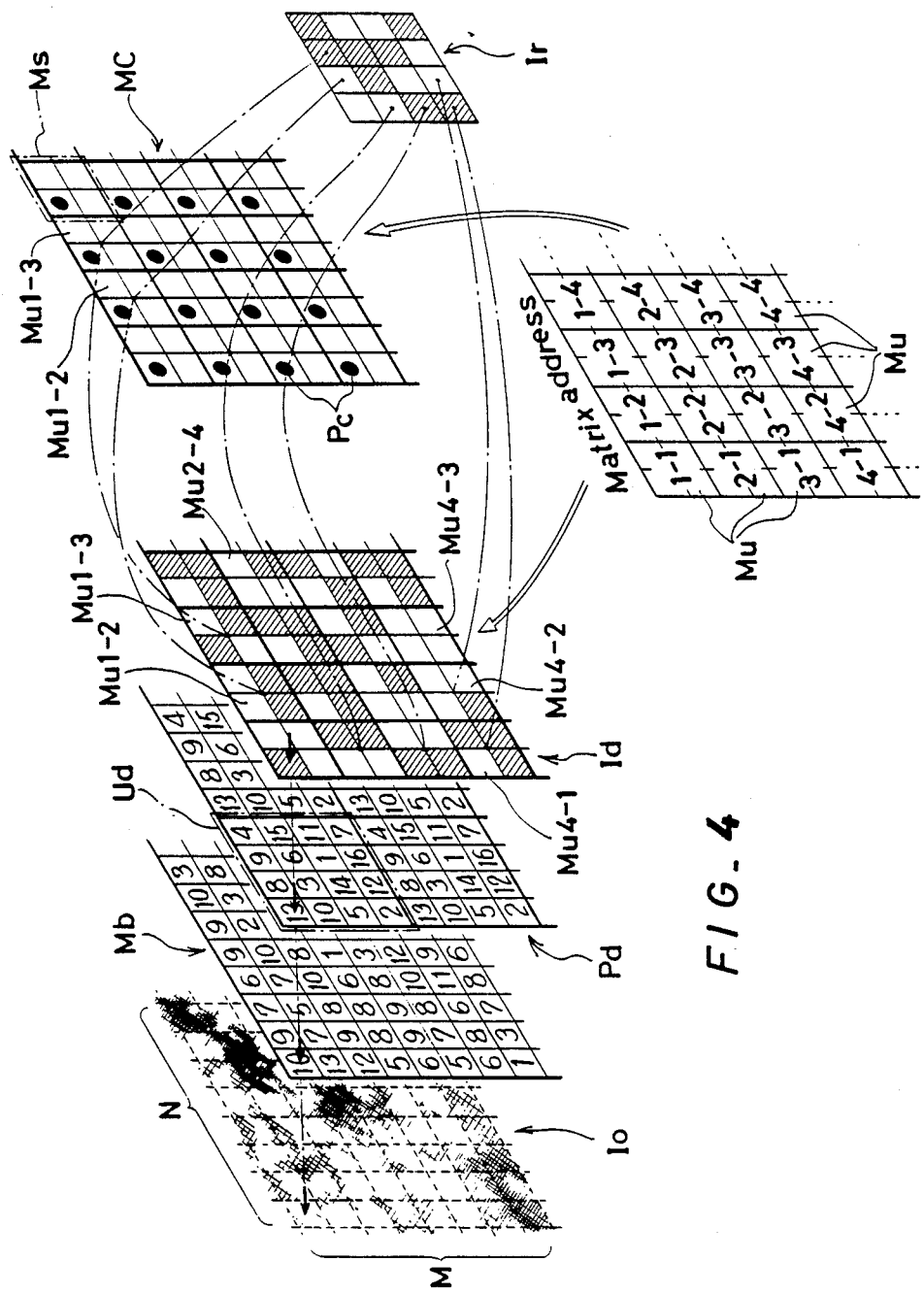
FIG. 4 is a diagrammatic illustration showing one example of a conceptional model for practicing the image reducing method according to this invention.

However, in a case where the black pixels are equal in number to the white pixels in the unit matrix (e.g. pixels Mu1-2, Mu1-3, Mu2-1, Mu3-1, Mu3-3 and Mu3-4 of the dither image Id in FIG. 4), the brightness of the picture element to which one unit matrix is reduced is decided according to a predetermined criterion matrix pattern MC. The criterion matrix pattern MC in this embodiment is basically formed of one unit criterion matrix Ms having one criterion point (datum point pixel) Pc which is marked with a spot in the drawings for brevity's sake. Therefore, the unit criterion matrix Ms is repeatedly used in the row and column directions of the matrix. In this embodiment, the criterion point Pc is located at the upper and left pixel in each unit criterion matrix Ms as shown in FIG. 4, and the number of the pixels of one side of the criterion matrix Ms as one unit is equal to the reciprocal (n) of the image reducing rate (1/n). However, this invention places no restriction on the location of the criterion point and the number of the pixels in the unit criterion matrix.

In the case that the black pixels in the unit matrix Mu of the dither image Id is as many as the white pixels, the pixel in the dither image corresponding to the prescribed criterion point Pc defined in the criterion matrix Ms is picked out (Process VIII). Then, the brightness of the pixel thus picked out is distinguished by identifying the pixel to be measured in the dither image Id which corresponds to the prescribed criterion point Pc in the criterion matrix Ms (Process XI). For instance, since the pixel in the unit matrix Mu1-2 in the dither image Id which corresponds to the criterion point Pc in the criterion matrix Mu1-2 is white, the picture element in the reduced image Ir corresponding to the unit matrix Mu1-2 is determined to be "white". In the matrix Mu1-3 of the dither image Id, a "black" pixel signal is outputted as one picture element in the reduced image Ir in accordance with the fact that the pixel in the unit matrix Mu1-3 corresponding to the criterion point Pc in the criterion matrix Mu1-3 is black. Thus, one pixel signal having the brightness feature of the unit matrix Mu in the dither image Id can be properly derived as one picture element from the unit matrix Mu to form the resultant reduced image Ir visually faithful to the originally given image Io.

Figure 5:
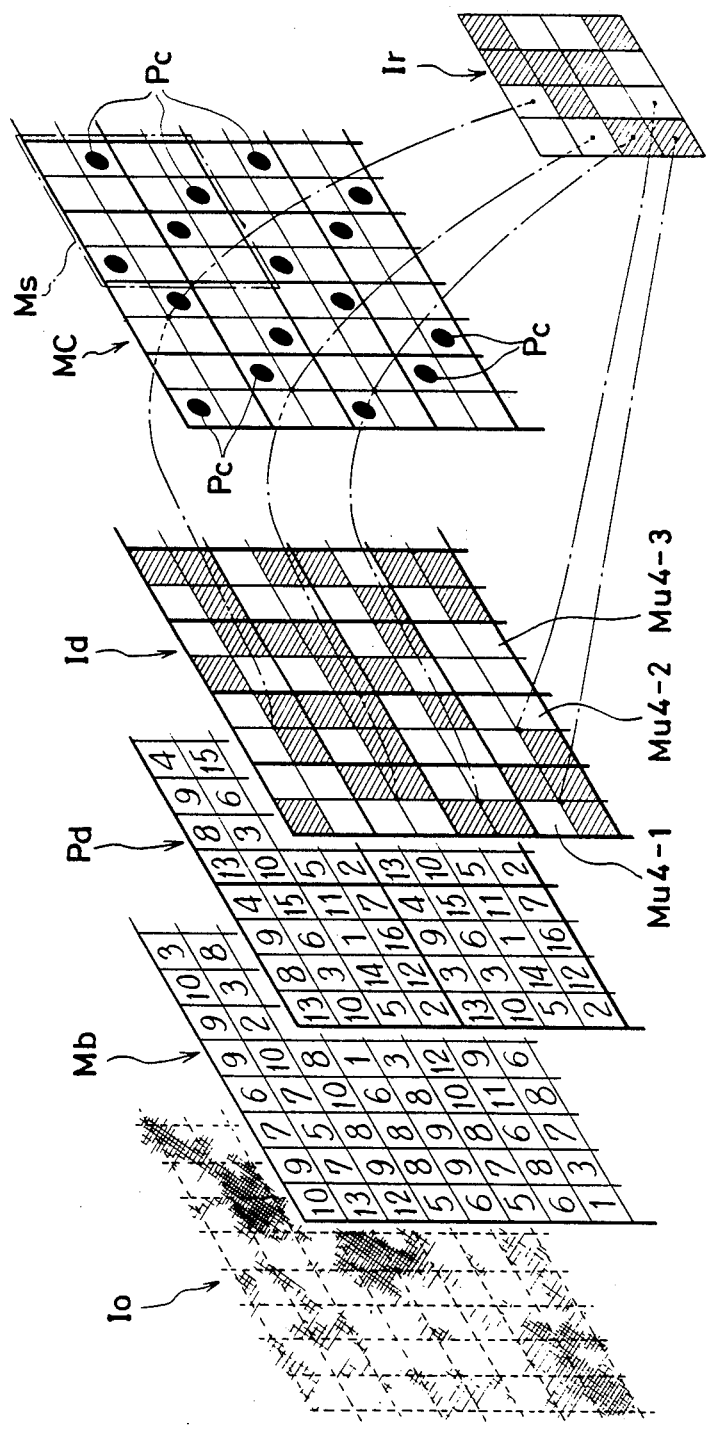
FIG. 5 is a diagrammatic illustration showing another example of the model for practicing the image reducing method according to this invention.
Figure 6A:
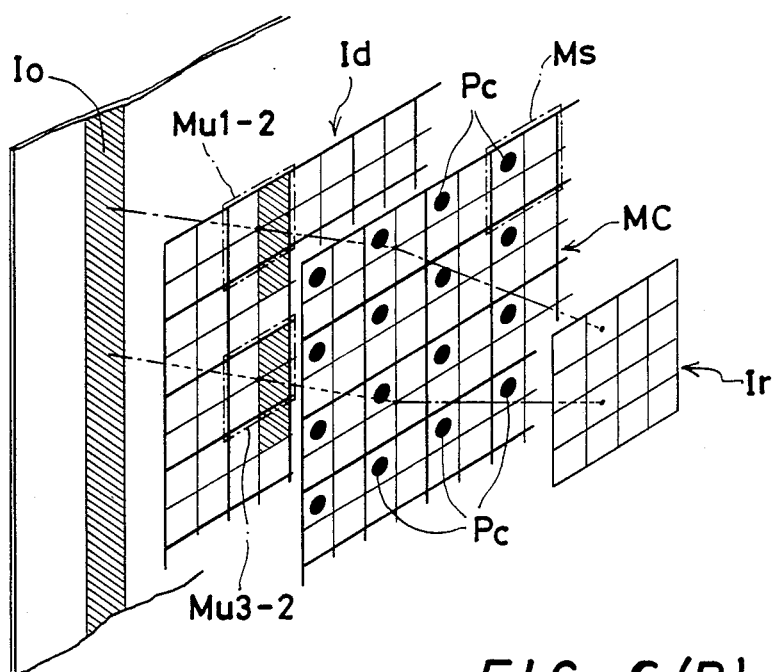
FIGS. 6(A) and 6(B) are diagrammatic illustrations for explaining the characteristics of the image reducing method of FIG. 4.

Though in the foregoing embodiment the row and column numbers of the criterion matrix Ms in which the criterion point Pc are prescribed is equal to the reciprocal n of the image reducing rate 1/n, they may be a multiple of n. That is to say, a criterion matrix Ms of $4 \times 4$, $6 \times 6$ or more can be selectively used. In the case of the criterion matrix Ms of 4 rows and 4 columns, the criterion points Pc prescribed one in each unit matrix (e.g. $2 \times 2$ matrix) may preferably be arranged discretely in pattern so that all the unit matrices of $2 \times 2$ in the criterion matrix Ms are different in criterion point from one another as seen in FIG. 5. With this arrangement of the criterion points, the probability of an oversight of the image data in the dither image Id as illustrated in FIG. 6(A) can be lessened. To be specific, when a thin line which is smaller in width than the dot pitch defined between the adjacent pixels in the matrix is given as an original image to be read, a discontinuous pattern like a dotted line appears on intermediate dither image Id as illustrated. Since the unit matrices Mu1-2 and Mu3-2 have the black pixels equal in number to half the total pixels of the respective unit matrices, they are collated with the prescribed criterion matrix pattern MC as noted above. Consequently, the unit matrices Mu1-2 and Mu3-2 are determined to be "white" because the pixels in these matrices corresponding to the prescribed criterion point Pc in the criterion matrix pattern MC are white. In the other unit matrices, the white pixels are not less than half the total pixels in each unit matrix. As a result, no black picture element appears on the resultant reduced image Ir. In conclusion, when a vertical or horizontal thin line which is given as an original image to be read misses the criterion points Pc prescribed in the criterion matrix pattern MC, it cannot be reproduced on the reduced image Ir resultingly obtained.

Figure 6B:
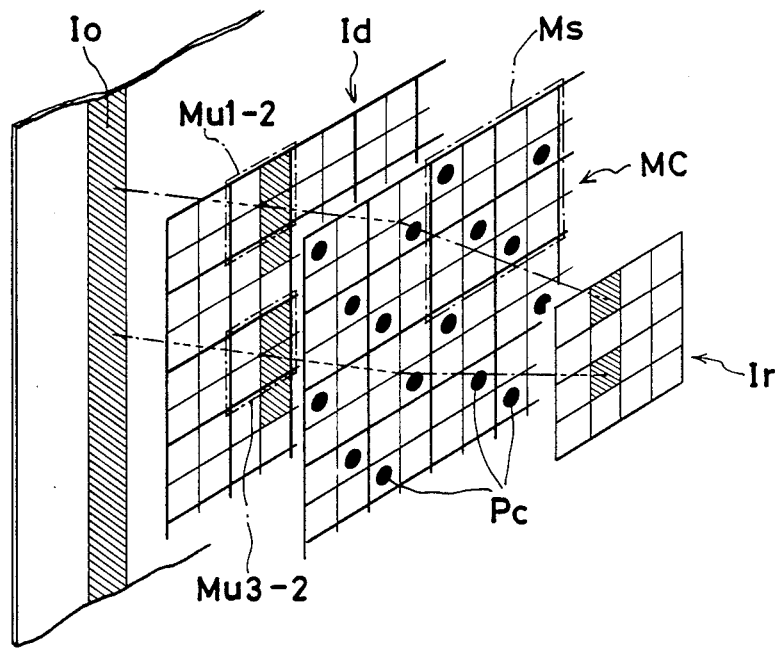

In this respect, by employing the criterion matrix Ms having the discretely arranged criterion points Pc as illustrated in FIG. 5, even a thin line given as an original image Io can be approximately expressed on the resultant reduced image Ir as illustrated in FIG. 6(B). Thus, according to this criterion matrix, the fidelity of the reduced image to the originally given image can be rather improved.

Figure 7:
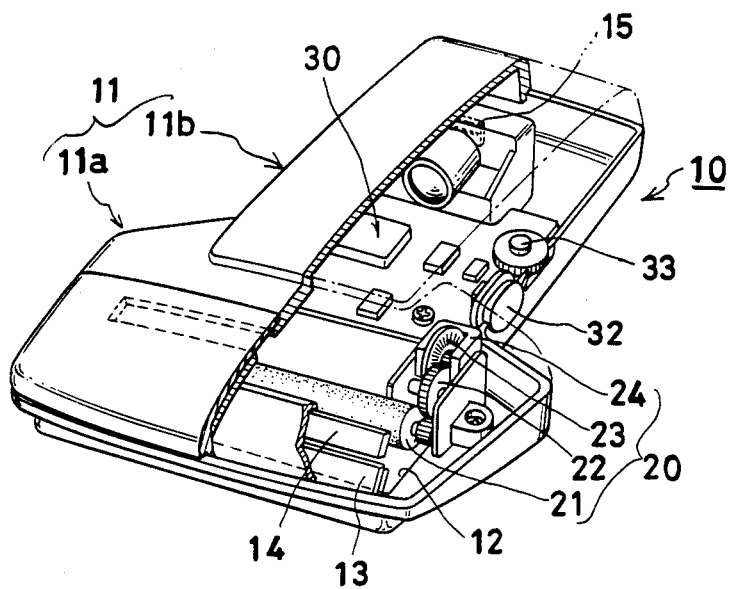
FIG. 7 is a perspective view of one example of an image scanner applicable to this invention.
Figure 8:
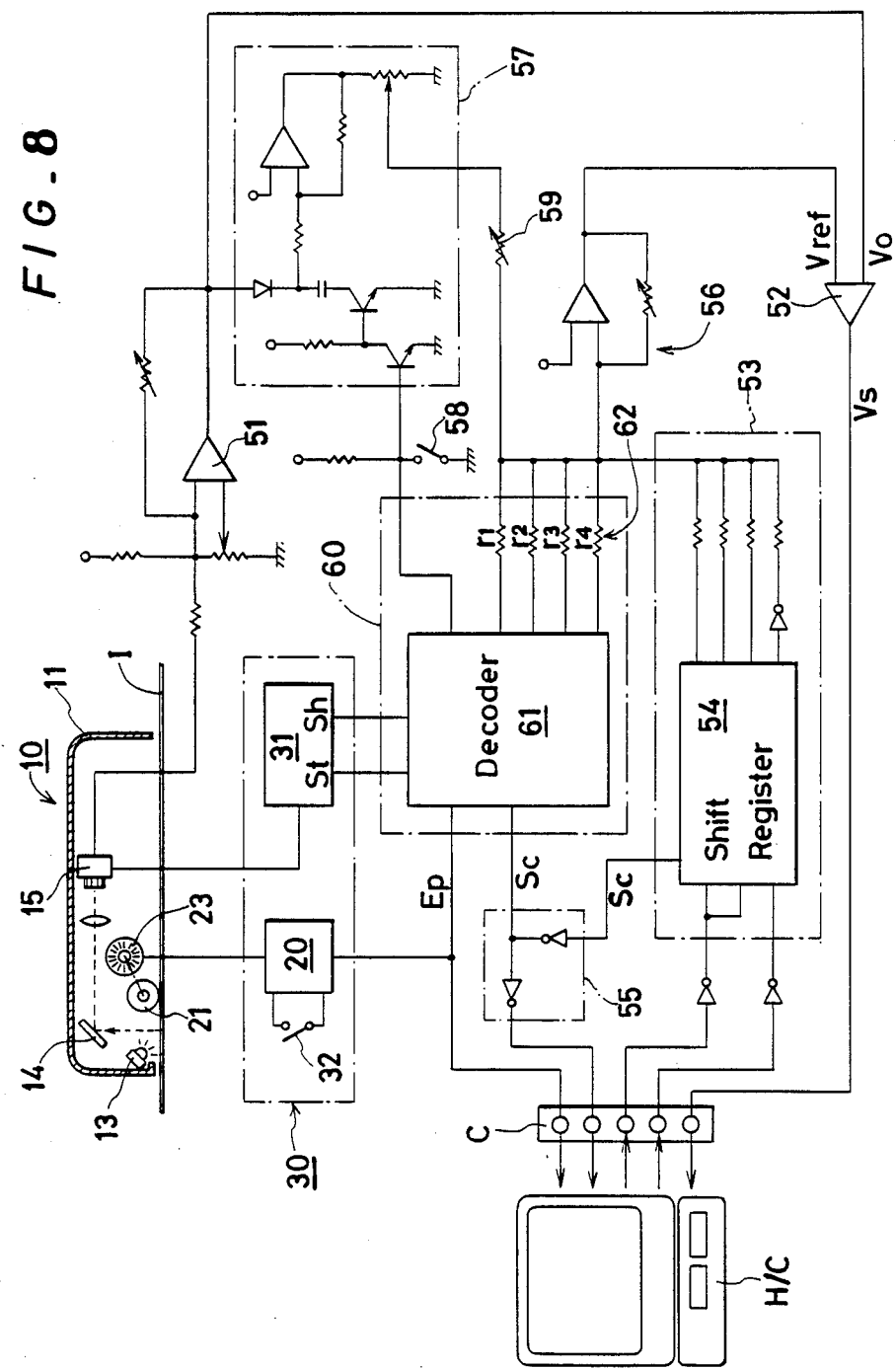
FIG. 8 is a block diagram of one embodiment of an image processing circuit for embodying the image reducing method according to this invention.

The image reading device and the processing system for practicing the image reducing method according to this invention are, as one example, illustrated in FIGS. 7 and 8.

As the image rading device, there may be used an image scanner 10 which is constituted by optical scanning means having an illuminator for illuminating the originally given objective image and a photoelectric element, and sub-scanning encoder means. A casing 11 for accommodating the aforementioned means is defined by a reader portion 11a on the front part thereof and a grip portion 11b on the rear part thereof. In the bottom of the reader portion 11a, a reading opening 12 which gives a view of the given objective image plane I is formed.

The optical scanning means touched upon above comprises a light source 13 for illuminating the objective image plane I through the reading opening 12, a reflecting means 14 for reflecting rearward a desired image light reflected from the objective image plane I in the direction substantially parallel to the objective image plane I, and an image sensor 15 for converting the image light from the objective image plane I to electric image data signals (video signals Vo). In this embodiment, there is adopted a line scanning method in which the given objective image to be scanned and read is notionally divided into a plurality of sub-scanning lines and scanned every sub-scanning line in order. Therefore, the light source 13 may be of the type capable of illuminating a linear portion on the objective image plane I, and the image sensor 15 may be of the type capable of picking up as an image the linear portion illuminated with the light source 13. For instance, there can be used an array of light emitting diodes (LED) as the light source 13 and a CCD line sensor as the image sensor 15.

A sub-scanning encoder 20 contained in the casing 11 comprises a roller 21 for allowing the image scanner 10 to be manually moved in the sub-scanning direction, at least one gear 22 for transmitting the rotation of the roller 21, a synchronizing rotary disc 23 which rotates synchronously with the roller 21, and a rotation detector 24 for detecting the rotation of a predetermined amount of the rotary disc 23. The rotary disc 23 has a plurality of slots arranged radially As the rotation detector 24, a photo-coupler or photo-interrupter may be used so that switching action can be optically effected by the existence of the slots formed in the rotary disc 23, thereby to output sub-scanning encoder pulses Ep by the angular rotation of the predetermined amount of the rotary disc 23.

Further, the image scanner 10 is provided with a control unit 30 for treating the image data signals outputted from the image sensor 15 and the encoder pulses generated by the sub-scanning encoder 20. The control unit 30 has a timing pulse generator 31 for regularly generating timing clock pulses necessary for synchronous processing of the image data signals.

The image scanner 10 is provided with a switch 32 for manually switching the scanner and a dial 33 for adjusting the tone or contrast of the resultant image to be outputted to the monitor display or the like.

The control unit of the image scanner 10 has an amplifier circuit 51 for subjecting the image data signals outputted from the image sensor 15 to negative feedback or inverting amplification, a comparator 52 adapted to compare the image data signals Vo outputted from the amplifier circuit 51 with a reference voltage Vref so as to produce digitized (e.g. binary-coded) video signals Vs, as illustrated in FIG. 8. By controlling the reference voltage Vref, various functions can be obtained. That is to say, the reference voltage Vref is controlled by such functional circuits as a tone regulating circuit 53 for freely determining the tone of the resultant image to be reproduced on the monitor display, a mode selection circuit 55 capable of setting magnification rate of the resultant image, and a dither setting circuit 60 showing the effect of processing a halftone image.

In the dither setting circuit 60 the aforementioned dither pattern Pd and the criterion matrix pattern MC are programmed. The output signals from the aforesaid functional circuits are given to a reference voltage generator 56 by which the reference voltage Vref is varied with the outputs from the dither setting circuit 60 and outputted to the comparator 52. By turning on a switch 58 to operate an envelope regulation circuit 57 so as to detect an envelope of the image data outputted from the image sensor 15, the halftone image such as a photograph is processed by subjecting the image data represented in the envelope form to pseudo-digitization on the basis of the dither pattern Pd programmed in the dither setting circuit 60. In the off-state of the switch 58, simple digitization is effected for processing a high-contrast image such as a character. The tone regulation is effected in accordance with instructions from the external image processing device (host computer) H/C, which are given to a shift register 54 in the tone regulating circuit 53. A shading-correction circuit 59 serves to eliminate shading strains which are inevitably caused when the image light passes through a lens systems in the image sensor and so on.

The dither setting circuit 60 comprises a decoder 61 and a dither matrix resistance circuit 62. In the illustrated embodiment, the dither matrix resistance circuit 62 is substantially composed of four resistors r1 to r4 which are determined in accordance with the prescribed 16 gradient levels of brightness, so that reference voltage values Vref with which the brightness values of the picture elements of the read image Mb are compared to obtain the intermediate dither image Id are outputted in accordance with the corresponding dither element values programmed in the form of the dither pattern Pd. That is, 16 levels of potential (reference voltage values) can be identified to one with 4 bits by bringing the four resistors r1 to r4 in a multiple relation (i.e. $8 \times r1 = 4 \times r2 = 2 \times r3 = r4$). Therefore, the reference voltage values Vref are selectively generated according to the predetermined dither pattern by selecting one or more resistors r1 to r4 under the control of the decoder 61.

In the case of selecting the equality mode, the reference voltage value Vref is updated each time the pixels of the read image are sequentially compared one by one with the corresponding reference values Vref. That is to say, the dither element values in the main scanning direction prescribed in the dither pattern Pd are updated one by one each time one main scanning pulse is outputted from the timing pulse generator 31, and the dither elements values in the sub-scanning direction are updated one by one each time one sub-scanning pulse is outputted from the sub-scanning encoder 20.

Figure 3:
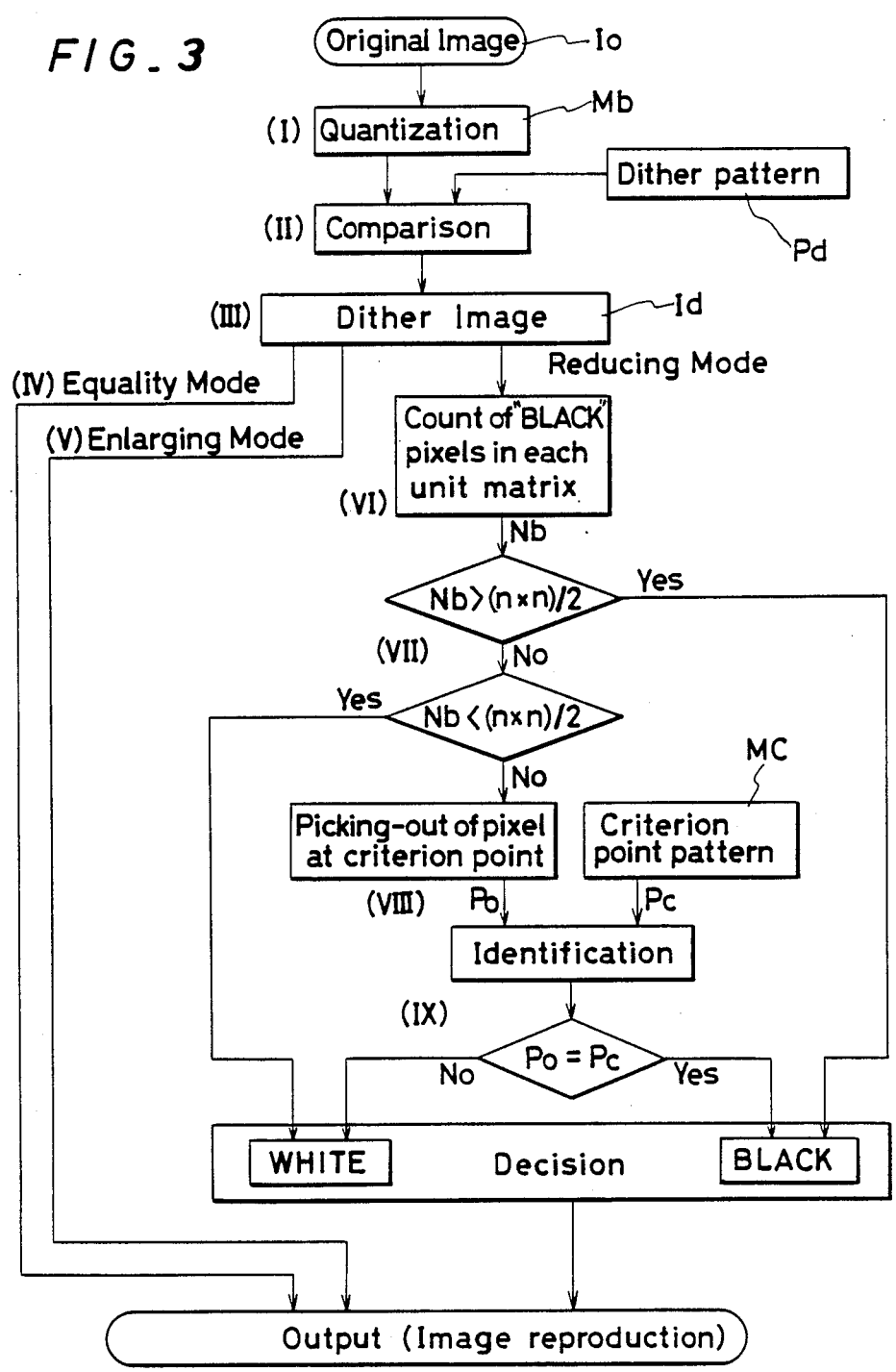
FIG. 3 is a flowchart of the process involved in the image reducing method according to this invention.

In a case where a mode selection signal Sc which is fed from the external image processing device H/C to the dither setting circuit 60 through the shift register 54 in the tone regulating circuit 53 signifies the image reducing mode, the image reducing function programmed in the decoder 61 is performed in accordance with the flowchart shown in FIG. 3 as described previously.

As has been described in the foregoing, according to the present invention there can be provided a very useful method by which a given original image read by an image reading device such as an image scanner can be reduced to obtain a desired reduced image on a monitor display or the like with high fidelity of image to the given original image. Particularly, a halftone image such as a photograph can be effectively subjected to image reduction processing by determining a unit matrix of a dither image derived from the original image in accordance with a prescribed criterion matrix pattern when black and white pixels in the unit matrix are equal in number, thereby to obtain a reduced image visually faithful to the original image. Besides, the method of this invention is practical use because it can be easily applied to the existing image processing system.

As can be appreciated, it is possible to deviate from the above embodiments of the present invention and, as will be readily understood by those skilled in this art, the invention is capable of many modifications and improvements within the scope and spirit thereof Accordingly, it will be understood that the invention is not to be limited by these specific embodiments, but only by the scope and spirit of the appended claims.

What is claimed is:

1. A method for image reduction processing, which comprises:
   preparing a criterion matrix pattern composed of at least one unit matrix having one criterion point,
   quantizing a given original image to obtain a brightness matrix image defined in a matrix with a plurality of pixels so that said pixels of the brightness matrix image are represented by brightness values and distinguished into black and white pixels,
   comparing brightness value in each pixel of said brightness matrix image with dither value at the corresponding pixel in a predetermined dither pattern to obtain an intermediate dither image,
   counting the respective black and white pixels in each unit matrix of said intermediate dither image so as to output as a reduced image signal one black picture element signal when the black pixels in the unit matrix of said intermediate dither pattern are more than the white pixels or one white picture element signal when the white pixels in the unit matrix of said intermediate dither pattern are more than the black pixels, and
   determining the picture element in the unit matrix having the black and white pixels of equal number to be black or white according to said unit criterion matrix pattern to derive one of black and white picture elements from each unit matrix of the intermediate dither image.

2. A method for image reduction processing according to claim 1, wherein determination of brightness of the picture element in said reduced image, when the corresponding unit matrix of said intermediate dither image has the black and white pixels of equal number, is effected by identifying the pixel in the unit matrix of dither image which pixel corresponds to the prescribed criterion point in the corresponding unit criterion matrix pattern so as to derive the black picture element from the unit matrix of the intermediate dither image when the pixel in the unit matrix of the dither image corresponding to the criterion point in the criterion matrix is black.

3. A method for image reduction processing according to claim 1, wherein said criterion matrix is formed of 2 rows and 2 columns and has one criterion point.

4. A method for image reduction processing according to claim 1, wherein said criterion matrix is formed of 4 rows and 4 columns so as to form four 2×2 unit matrices each having one criterion point, said unit matrices are different in criterion point from one another.

5. A method for image reduction processing according to claim 1, wherein said criterion matrix is formed of a plurality of unit matrices each having one criterion point.

6. A method for image reduction processing according to claim 1, wherein the pixels constituting said dither pattern is an even number.

7. A method for image reduction processing according to claim 1, wherein the number of the pixels of one side of each unit matrix in the dither image and the criterion matrix pattern is equal to a reciprocal of an image reducing rate.

8. A method for image reduction processing according to claim 1, wherein the number of the pixels of one side of each unit matrix of the dither image and the criterion matrix pattern is equal to a reciprocal multiple of an image reducing rate.

* * * * *